H. O. JACKSON.
VEHICLE WHEEL.
APPLICATION FILED AUG. 7, 1908.

920,469.

Patented May 4, 1909.

Witnesses:
John Enders
Clyde Palmer

Inventor:
Henry O. Jackson,
By Dyrenforth, Lee, Chritton & Wiles
Attys.

UNITED STATES PATENT OFFICE.

HENRY O. JACKSON, OF CHICAGO, ILLINOIS, ASSIGNOR TO JACKSON WHEEL COMPANY, OF CHICAGO, ILLINOIS, A CORPORATION OF ARIZONA TERRITORY.

VEHICLE-WHEEL.

No. 920,469.   Specification of Letters Patent.   Patented May 4, 1909.

Application filed August 7, 1908. Serial No. 447,362.

*To all whom it may concern:*

Be it known that I, HENRY O. JACKSON, a citizen of the United States, residing at Chicago, in the county of Cook and State of Illinois, have invented a new and useful Improvement in Vehicle-Wheels, of which the following is a specification.

My primary object is to provide a novel construction of vehicle wheel of the type employing springs for supporting the rim on the hub, which will be capable, in its use on a vehicle, of absorbing vibrations produced in traveling over rough roads.

Another object is to provide a construction of wheel of the type above referred to which will permit of the use of as many springs as are necessary under any conditions and still afford the desired extent of rotary movement of the hub of the wheel relative to its rim for relieving strain upon the engine for driving the vehicle, when the latter is started and stopped.

My invention is illustrated in the accompanying drawing, in which—

Figure 1:
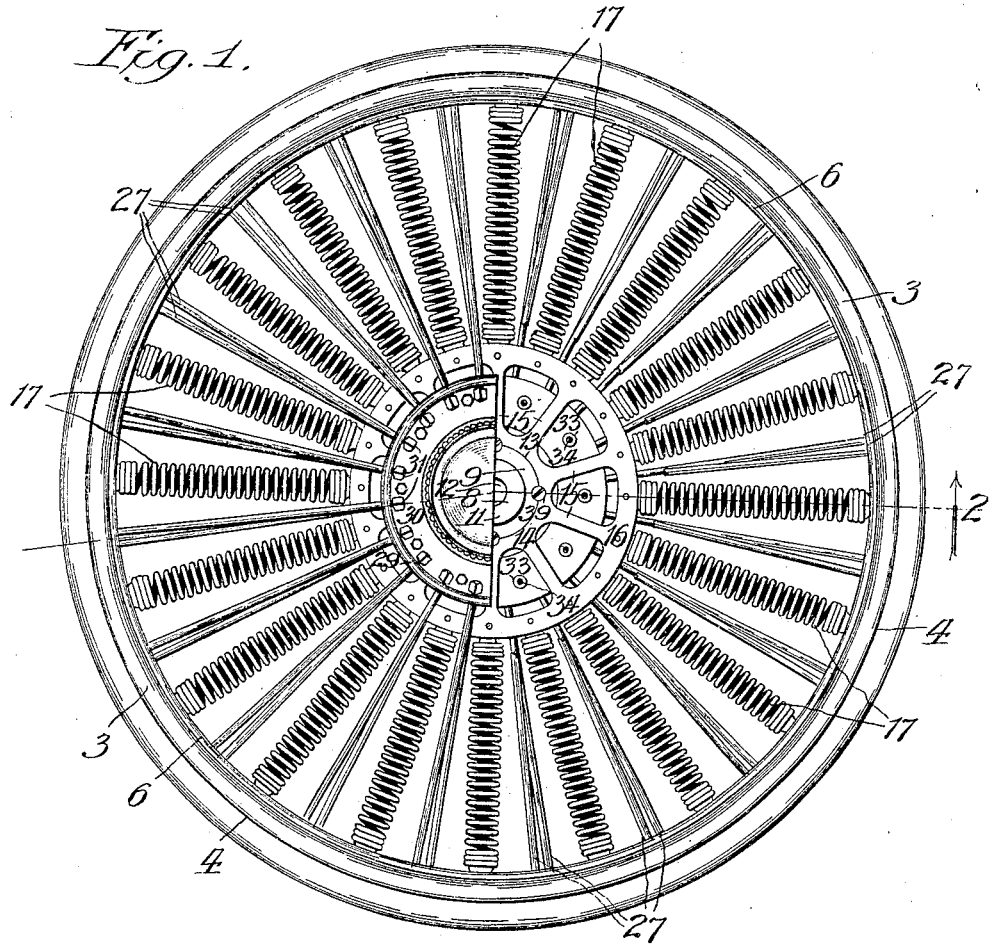
Figure 2:
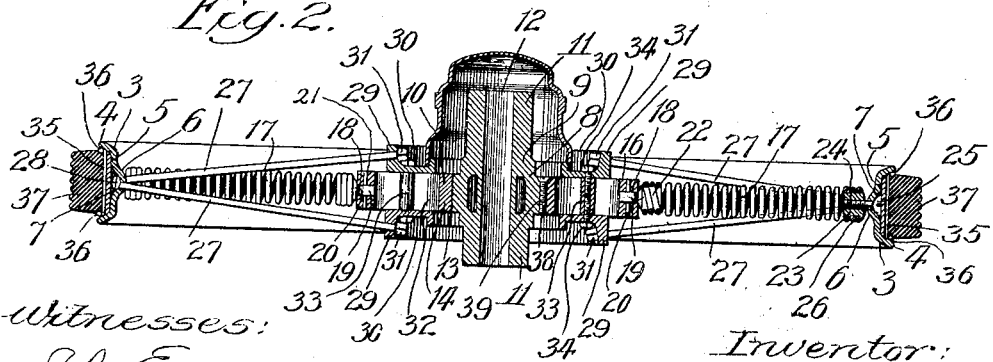

Figure 1 is a view in side elevation of a wheel constructed in accordance with my invention, one-half of the wheel being shown in sectional elevation; and Fig. 2, a section taken at the irregular line 2 on Fig. 1 and viewed in the direction of the arrow.

The rim of the wheel, which is represented at 3, is preferably formed in one piece to afford tire flanges 4, a tire-seat 5 and an inner circumferential rib 6 affording an outwardly-opening channel 7.

The hub of the wheel, which is represented at 8, is preferably formed of two sections 9 and 10, the inner section 9 having the lateral extensions 11 and the transverse opening 12 for the usual purposes. The periphery of the section 9 is threaded, as represented at 13, and screwed upon these threads is the hub-section 10 which has a central solid ring-portion 14 and a series of arms 15 radiating outwardly from it and spaced equidistant from each other, the outer ends of these arms being connected together, preferably integrally, by a ring-shaped member 16, this member in effect being composed of integral extensions on the arms, integrally connected together.

The rim 3 is held to the hub by a series of radially disposed coil springs 17, each of which is secured to the hub and rim by the following described construction:

The ring-member 16 contains an annular series of recesses 18 extending inwardly from its outer periphery, as represented in Fig. 2, the number of recesses 18 corresponding with the number of springs 17 employed. Fitting in each recess 18 at an eye 19 is a bolt 20, these bolts being held in the recesses by pins 21 which fasten in the walls of the recesses 18 in the member 16. It is preferred that the eye-portions 19 of the bolts 20 be so fastened to the ring 16 by the pins, that the bolts will have pivotal connection therewith. The outer ends of the bolts terminate in circular enlarged shanks 22 to which the inner ends of the coil spring 17 are fastened, as hereinafter described. The outer ends of these springs carry heads 23 into which bolts 24, passing inwardly through the rim 3, screw at their threaded ends, the heads 25 of these bolts being of concave shape, as represented, to fit into the channel 7.

It is desired that the springs be assembled with the heads 22 and 23 by screwing the latter, which are provided on their peripheries with concave threads 26, into the ends of the springs.

The spokes proper of the wheel are represented at 27 and are arranged in pairs, the spokes of each pair being opposed at a slight angle to each other and extending on opposite sides of the median line of the wheel. The outer ends of these spokes extend through the rib 6 and are held in place by heads 28 thereon which seat in the channel 7. The inner ends of these spokes extend through the annular flanged portions 29 of the pair of centrally disposed rings 30 and are held rigid by nuts 31 which screw upon the threaded inner ends of the spokes, as represented. The rings 30 are of such a diameter as to reach short of the rings 16, but extend a considerable distance beyond the bottoms of recesses 32 formed between the arms 15 and the ring 16, and reach short of the outer walls of these recesses, as illustrated in Fig. 1, the internal diameter of these ring-members 30 being such as to cause them to extend beyond the joint formed between the hub-sections 9 and 10.

To insure the proper lateral spacing of these rings 30 relative to each other and the hub 8, spacers 33, in the form of sleeves, are provided between these rings into which sleeves and rings, from opposite sides thereof, bolts 34 are screwed, these spacers being arranged in the rings to alternate with the arms 15 and extend centrally through the spaces 32.

The springs 17 are preferably assembled with the other parts of the wheel under relatively high tension, either expansion or compression, it being preferred, however, that these springs be under a compression tension of about four hundred and fifty pounds when the number of springs employed correspond with the number illustrated, though the compression tension of these springs may be varied to suit varying conditions.

It will be understood that when the parts are assembled, the hub 8 will be concentric with the rim 3, and the rings 30 concentric with both the rim and the hub, and that these rings will be spaced a sufficient distance apart to permit the hub to move relative to them but be guided thereby.

The provision of the springs 17, which serve to afford great resiliency to the wheel, renders it unnecessary that a pneumatic tire be employed, and thus any suitable solid tire may be used. The variety of solid tire illustrated is of a well-known form having transversely-extending rods 35 embedded in its base-portion at which it sets on the portion 5 of the rim, with wire retaining-rings 36 embedded in the side surfaces of the tire 37 and resting on the ends of the rods 35.

It will be noted that by placing all of the springs 17 under an equal compression tension, weight upon the hub of the wheel will cause the springs below the hub to be still further compressed, and therefore placed under greater tension, whereas the springs above the hub will be lengthened, thus tending to place them in normal condition. By this construction the springs are caused to absorb all of the ordinary vibration and shock which occurs in traveling over rough road, preventing such vibrations from being communicated to the vehicle-body, and thus the advantages of pneumatic-tired wheels is afforded. Furthermore, it will be noted that the rings 30 are held in rigid condition relative to the arm 3 and thus serve constantly to hold the hub 8 in proper alinement with the arm.

To prevent the section 10 from unscrewing from the section 9 of the hub, I provide a series of screws 38 which screw into opposed openings 39 in these hub-sections at their point of juncture.

The connections of the rim 3 with the hub 8 being flexible, permits the latter to have partial rotary movement relative to the rim, and thus in the starting or stopping of the engine for driving the vehicle to which the wheels are applied, the great strain upon it, which occurs in the cases where a wheel not so constructed is employed, is greatly obviated.

The provision of means for permitting each alternate spring 17 to be secured to the hub 8 at points intermediate the arms 15 allows the openings 32 to be relatively large through which the sleeves 33 extend, and thus a wheel may be provided with any number of springs desired without reducing the desired degree of rotary movement of the hub with relation to the rim.

It will be manifest from the foregoing description that the wheel may be readily disassembled in whole or in part and new parts be readily substituted should parts become impaired, and that each of the springs 17 may be adjusted independently of the others.

What I claim as new, and desire to secure by Letters Patent, is—

1. A vehicle-wheel comprising, in combination, a rim, a hub provided with a series of openings extending through it intermediate of its central portion and its periphery, a series of radially-extending coiled springs connected at their outer ends with the rim and at their inner ends with the hub at its periphery, rim-alining members on opposite sides of the hub, means connecting said rim-alining members with the rim, and spacing means for said rim-alining members extending through said openings.

2. A vehicle-wheel comprising, in combination, a rim, a hub provided with a series of transverse openings intermediate of its periphery and center portion, the hub containing outwardly opening recesses in its periphery, a series of radially-disposed coiled springs connected at their outer ends with the rim and at their inner ends with the hub at the recesses therein, rim-alining members on opposite sides of the hub, means connecting said rim-alining members with the rim, and spacing-members for said rim-alining members extending through the transverse openings in the hub, said spacing-members being of such size relative to the transverse openings through which they extend as to permit of their having limited play therein.

HENRY O. JACKSON.

In presence of—
WILLIAM B. DAVIES,
RALPH SCHAEFER.